United States Patent
Meier et al.

(10) Patent No.: US 6,523,590 B2
(45) Date of Patent: Feb. 25, 2003

(54) RUBBER COMPOSITION FOR TIRE SIDEWALLS

(75) Inventors: Heinrich Meier, Heessen (DE); Reinhard Teves, Seelze (DE)

(73) Assignee: Continental Aktiengesellschaft (DE)

( * ) Notice: Subject to any disclaimer, the term of this patent is extended or adjusted under 35 U.S.C. 154(b) by 0 days.

(21) Appl. No.: 09/388,081

(22) Filed: Aug. 27, 1999

(65) Prior Publication Data

US 2002/0173574 A1 Nov. 21, 2002

(30) Foreign Application Priority Data

Aug. 28, 1998 (DE) .......................... 198 39 271

(51) Int. Cl.$^7$ .............................. B60C 5/00; C08K 3/34
(52) U.S. Cl. ...................... 152/525; 524/430; 524/441; 524/449
(58) Field of Search ................................ 524/449, 430, 524/441; 152/525

(56) References Cited

U.S. PATENT DOCUMENTS

| | | | | |
|---|---|---|---|---|
| 5,997,627 A | * | 12/1999 | Babler | 106/493 |
| 6,093,271 A | * | 7/2000 | Majumdar | 156/116 |
| 6,251,981 B1 | * | 6/2001 | Tanaka et al. | 524/457 |

* cited by examiner

Primary Examiner—Peter D. Mulcahy
(74) Attorney, Agent, or Firm—R W Becker & Associates; R W Becker

(57) ABSTRACT

A non-black rubber composition for pneumatic vehicle tire sidewalls consists of one or more rubber components, at least one processing agent, at least one additive, a first filler containing silica, 5 to 30 phr of a second filler containing mica platelets having a metal oxide coating, wherein the mica platelets have an average platelet size of up to $2 \cdot 10^{-4}$ m, 0.1 to 8 phr of a third filler in the form of aluminum powder having an average particle size of up to $8 \cdot 10^{-5}$ m.

10 Claims, No Drawings

RUBBER COMPOSITION FOR TIRE SIDEWALLS

BACKGROUND OF THE INVENTION

The present invention relates to a non-black rubber composition for sidewalls of pneumatic vehicle tires which contains as a polymer one or more rubber components, as a first filler at least silican as well as further processing aids and further conventional additives.

Rubber mixtures for sidewalls of pneumatic vehicle tires must fulfill high standards and requirements. They must be mechanically/dynamically very stable in order to remain intact, for example, when driving across high curb edges. Furthermore, the sidewalls of a pneumatic vehicle tire should be wear-resistant in order not to be damaged when scraping along curbs. Furthermore, they are subjected to solar radiation more than any other tire component so that the elastomer mixture must be age-resistance, respectively, must contain antioxidants. Since the sidewall, especially when the vehicle is parked, catches the eye of a passer-by, it is especially suitable as a design object. For example, it is known in the prior art to provide colorful lettering as well as colored sidewalls. For such designs, elastomer mixtures are needed which have the aforementioned properties and must be colorfast over the entire service life of a pneumatic vehicle tire.

From German patent application 34 14 438 and German Gebrauchsmuster 82 34 954.1 variations are known in which either a black sidewall is covered by a transparent elastomer layer which contains mica platelets or the entire sidewall is made of such a transparent elastomer mixture which contains mica platelets. These mica platelets, which may also have a coating of metal oxides, are supposed to impart to the elastomer matrix excellent reflective properties. However, it was found that even though a sufficient reflection could be obtained, these mixtures over time would turn yellow. Additional elastomer layers known from German patent application 34 14 438 furthermore have the disadvantage that, in addition to being produced separately, they must be applied in an additional method step onto the sidewall, which results in increased cost and time expenditure. Furthermore, layer separation between the individual layers may occur.

It is therefore an object of the present invention to produce sidewalls for pneumatic vehicle tires that, with respect to process-technological considerations, are simple to produce, have excellent reflective properties as well as a long-lasting luminous silvery coloration.

SUMMARY OF THE INVENTION

The object is inventively solved in that for 100 parts by weight of total rubber mixture, a second filler in the amount of 5 to 30 phr in the form of mica platelets, which are coated with a metal oxide, is provided whereby the mica platelets have an average platelet size of up to $2 \cdot 10^{-4}$ m, and furthermore a third filler is provided which is in the form of 0.1 to 8 phr of aluminum powder having an average particle size of up to $8 \cdot 10^{-5}$ m.

Surprisingly, such a rubber mixture for sidewalls, when vulcanized, provides an excellent reflective appearance in combination with excellent silvery shine or luminance. This property combination was not to be expected because, on the one hand, tests with rubber mixtures, containing only aluminum powder, as tire sidewalls resulted in tire sidewalls having no metallic shine (for minimal aluminum powder concentrations) or, over time, were reactive with regard to other mixture components so that the tire sidewalls would appear gray (for higher aluminum concentrations). On the other hand, tire sidewalls prepared with rubber compositions containing only mica particles coated with metal oxide as a filler would result in the aforementioned yellow discoloration. Therefore, it was so surprising to find that the inventive combination solved the problem of discoloration and, at the same time, provided an optically appealling metallic shine or luminance with excellent reflective properties.

The inventive rubber mixture or composition for tire sidewalls contains as a first filler silica, preferably in an amount of 10 to 60 phr, because silica provides excellent transparent properties and thus imparts to the vehicle tire sidewall the desired appearance. Furthermore, advantages with respect to wear are obtained. Moreover, the reinforcing action of silica is taken advantage of, whereby it was found that for concentrations >60 phr the dynamic behavior of the vulcanized tire decreased. Accordingly, this concentration, especially for tire sidewalls, should not be surpassed. Silica for use with the inventive rubber mixture is known from the prior art. For example, silica having a BET surface of 145 to 270 $m^2/g$ (ASTM D 5604), a CTAB number of 120 to 285 $m^2/g$ (ASTM D 3765), and a pore volume of 0.7 to 1.7 ml/g (DIN 66133) are to be used. For example, silica by the designation VN3 (trade name of the company Degussa) can be used.

For binding silica to the polymer system, activating agents, for example silane such as bis-3-(triethoxysilylpropyl)tetrasulfide (TESPT) or the corresponding disulfide can be used which in the context of the present invention is to be considered a conventional additive.

Furthermore, the inventive rubber mixture contains other conventional additives such as colorfast anti-aging substances, (e.g., styrene-modified phenols or di-tert.-butyl-p-kresol (BHT), softeners (e.g., phthalic acid ester) and processing agents (e.g., stearic acid, wax, fat, dispersing agents). Especially preferred is the use of a phenolic resin as a processing aid which is colorfast whereby such a phenolic resin has processing-technological advantages, for example, with respect to flowability and tackiness of the rubber mixture during tire building.

The vulcanization of the rubber composition requires sulfur or sulfur-producing substances (e.g., DTDM-dimorpholyldisulfide). However, it is also possible to initiate and perform vulcanization with the aid of other vulcanization agents (e.g., peroxide, resin, radiation). Furthermore, vulcanization-effecting substances such as accelerators or activators for the selected vulcanization type (e.g., for sulfur-induced vulcanization materials such as CBS: benzothiazyl-2-cyclohexylsulfenamide, TMTD: tetramethylthiuramdisulfide, TBBS: benzothiayl-2-tert.-butylsulfenamide) are to be added to the rubber mixture.

It is especially preferred when the non-black rubber mixture for sidewalls has an amount of aluminum powder of $\leq 1$ phr, for example, 0.2 to 0.7 phr. It was surprisingly found that such amounts are sufficient in order to produce a metallic shine. Furthermore, an average particle size of the aluminum powder of $<5 \cdot 10^{-5}$ m is preferred. The greater scattering effect of the smaller particles increases the shine of the vehicle tire sidewall.

The mica to be used for the inventive sidewall rubber mixture is an aluminum based silicate (e.g., biotite or muscovite) that is coated with a metal oxide, preferably titanium dioxide. It is preferred when the amount of metal oxide-coated mica is 8 to 20 phr. The combination of different individual particle size fractions can be used to optimize the reflective behavior of the sidewall of the pneumatic vehicle tire.

In addition, one or more other fillers can be added, for example, organic dyes and/or pigments which, however, do not have an effect on the reflective behavior and the metallic shine of the tire sidewall. Thus, reflective and colored, brilliantly shiny vehicle tire sidewalls can be produced.

The rubber components for the inventive sidewall composition is selected from, for example, ethylene propylene diene terpolymer, polyisoprene, styrene butadiene copolymer. Especially preferred is natural rubber, butyl rubber, halogenated butyl rubber, polybutadiene and/or an isobutylene polymer that is modified with p-bromometylstyrene.

With the inventive sidewall rubber mixture tire sidewalls are produced which, on the one hand, have excellent optical properties (reflectiveness and metallic shine) and, at the same time, still fulfill the mechanical/dynamic requirements with respect to wear resistance and resistance to ozone-induced cracks. Furthermore, no additional method steps are required for producing the tire, such as subsequent application of a foil. It is especially preferred when the non-black sidewall rubber mixture is used for manufacturing passenger car tires because in this market segment the demand for reflective and brilliantly shining sidewalls is especially great.

DESCRIPTION OF THE PREFERRED EMBODIMENTS

The advantages of the present invention will be explained in more detail in the following with a specific embodiment.

TABLE

| Ingredients | Comparative Composition (phr) 1 | Comparative Composition (phr) 2 | Inventive Composition (phr) 3 |
|---|---|---|---|
| Natural Rubber | 25 | 25 | 25 |
| Polybutadiene | 30 | 30 | 30 |
| EXXPRO 3745* | 45 | 45 | 45 |
| Carbon Black | 0.1 | – | – |
| Silica | 50 | 50 | 30 |
| Silane Si69** | 4 | 4 | 2.4 |
| Iriodin 103*** | – | 5 | 5 |
| Iriodin 123*** | – | 5 | 5 |
| Iriodin 163*** | – | 5 | 5 |
| Aluminum Powder | – | – | 1 |
| Mineral Oil | 8 | 8 | 8 |
| Bisphenolic Anti-aging Substance | 4 | – | – |
| Durez 19900**** | 10 | 10 | 10 |
| Stearic Acid | 1 | 1 | 1 |
| ZnO | 3 | 3 | 3 |
| TiO$_2$ | 10 | – | – |
| Sulfur | 0.6 | 0.6 | 0.6 |
| Accelerator MBTS | 1.5 | 1.5 | 1.5 |

*Fa. EXXON Chemical, USA
*Fa. Degussa AG, Frankfurt/M., Germany
***Fa. Merck, Darmstadt, Germany
****Fa. Occidental Chem. Genk., Belgium The ingredients disclosed in the table were mixed in a conventional manner. After building the green pneumatic vehicle tire, whereby the above disclosed compositions were used for the sidewalls, the green tires were subjected to vulcanization under conventional conditions. After vulvanization, it was found that the tires with the sidewall composition 1 showed a gray coloration without reflective properties and without metallic shine. The tire with the sidewall composition 2 had the disadvantage that the sidewall over time showed a yellow discoloration. In comparison, the inventive composition 3 showed the best results with respect to reflective behavior and metallic shine. Furthermore, it was found that the other properties with respect to aging resistance or mechanical/dynamic behavior of the sidewall composition 3 did not deteriorate. The inventive combination for the tire sidewall mixture did not require the additional application of, for example, colored foils whereby the problem of separation of individual layers is avoided.

The specification incorporates by reference the disclosure of German priority document 198 39 271.0 of Aug. 28, 1998.

The present invention is, of course, in no way restricted to the specific disclosure of the specification and drawings, but also encompasses any modifications within the scope of the appended claims.

What is claimed is:

1. A sidewall for a pneumatic vehicle tire, said sidewall comprising:

a non-black rubber composition comprising one or more rubber components;

at least one processing agent;

at least one additive;

a first filler comprising silica; 5 to 30 phr of a second filler comprising mica platelets having a metal oxide coating, said mica platelets having an average platelet size of up to $2 \times 10^{-4}$ m; and 0.1 to 8 phr of a third filler in the form of aluminum powder having an average particle size of up to $8 \times 10^{-5}$ m, wherein said non-black rubber composition is selected from the group consisting of colored, white, gray, and silver rubber compositions.

2. A sidewall according to claim 1, wherein said aluminum powder is present in an amount of $\leq 1$ phr.

3. A sidewall according to claim 1, wherein said average particle size of said aluminum powder is $<5 \times 10^{-5}$ m.

4. A sidewall according to claim 1, wherein said mica platelets are comprised of discrete fractions of particle sizes added separately to said one or more rubber components.

5. A sidewall according to claim 1, wherein said mica platelets are present in an amount of 8 to 20 phr.

6. A sidewall according to claim 1, wherein said metal oxide coating consists of titanium dioxide.

7. A sidewall according to claim 1, wherein said silica is present in an amount of 10 to 60 phr.

8. A sidewall according to claim 1, further comprising a fourth filler comprising one or more color-imparting substances selected from the group of dyes and pigments.

9. A sidewall according to claim 1, wherein said rubber components are selected from the groups consisting of natural rubber, polybutadiene, butyl rubber, halogenated butyl rubber, and isobutylene polymer modified with p-bromomethyl styrene.

10. A sidewall according to claim 1, wherein said at least one processing agent is a colorfast phenolic resin.

* * * * *